US008068798B2

(12) United States Patent
Wilcox et al.

(10) Patent No.: US 8,068,798 B2
(45) Date of Patent: Nov. 29, 2011

(54) FULL CLOSED LOOP AUTO ANTENNA TUNING FOR WIRELESS COMMUNICATIONS

(75) Inventors: Bruce E. Wilcox, Cary, NC (US); Mete Ozkar, Raleigh, NC (US); Kerrance L. Carpenter, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 577 days.

(21) Appl. No.: 12/211,610

(22) Filed: Sep. 16, 2008

(65) Prior Publication Data

US 2010/0041348 A1 Feb. 18, 2010

Related U.S. Application Data

(60) Provisional application No. 61/089,397, filed on Aug. 15, 2008.

(51) Int. Cl.
*H04B 1/04* (2006.01)
(52) U.S. Cl. .......... 455/121; 455/193.1; 455/195.1; 455/173.1; 455/191.1; 455/192.3
(58) Field of Classification Search .......... 455/160.1, 455/193.1, 191.1, 197.3
See application file for complete search history.

(56) References Cited

U.S. PATENT DOCUMENTS 6,081,700 A * 6/2000 Salvi et al. ................. 455/193.3
2006/0183443 A1 * 8/2006 Chang et al. ................ 455/121

FOREIGN PATENT DOCUMENTS

EP 1 655 850 A1 5/2006

OTHER PUBLICATIONS

International Preliminary Report on Patentability dated Oct. 15, 2010 issued in corresponding PCT application No. PCT/US2009/043103, 10 pages.
International Search Report dated Nov. 20, 2009 issued in corresponding PCT application No. PCT/US2009/043103, 12 pages.

* cited by examiner

*Primary Examiner* — Charles Appiah
*Assistant Examiner* — Randy Peaches
(74) *Attorney, Agent, or Firm* — Snyder, Clark, Lesch & Chung, LLP

(57) ABSTRACT

A wireless terminal includes an RF transceiver, an auto tuner, and an antenna. When a remote signal is received at the wireless terminal, the auto tuner is adjusted in accordance with the received signal to optimize OTA performance of the wireless terminal. As further remote signals are received by the wireless terminal, the tuner is readjusted. As a user inputs information to be transmitted, the tuner is also readjusted in accordance with the transmission signals to optimize OTA performance of the wireless terminal, and a best compromise between the TX OTA performance and the RX OTA performance is calculated. Current/temperature information may also be obtained for readjusting the tuner.

8 Claims, 10 Drawing Sheets

FULL CLOSED LOOP AUTO ANTENNA TUNING FOR WIRELESS COMMUNICATIONS

BACKGROUND

The present disclosure relates to wireless communication devices, more particularly to optimizing over the air (OTA) performance of a wireless terminal.

Wireless terminal OTA performance requirements get tougher each year. Today, many companies are developing auto antenna tuners for the wireless industry. These tuners "map" the natural antenna impedance to another value that better suits the radio. This process is known as antenna matching.

The prior art methods for antenna matching focus on optimization of the transmission (TX) path performance. The TX mode antenna impedance is actively transformed back to the "ideal" 50 Ohm port impedance. The receiving (RX) mode performance is assumed to improve during optimization of the TX mode.

There are three main problems with the prior art approach. First, the TX system OTA performance, which is indicated by desired total radiated power (TRP), low battery current (Ibatt), and low operating phone temperature, may not optimize at 50 Ohms. Second, the RX system OTA performance, which is indicated by total isotropic sensitivity (TIS), may not achieve an optimum performance level with a TX mode derived antenna match. Given a typical antenna, the RX frequency band impedance is quite different when compared to the TX frequency band antenna impedance. Thus, there is no guarantee that the RX system will achieve optimum performance with a TX only derived auto-tuner match. Third, prior art tuning does not address the safety aspects associated with auto tuning methods. Safety issues include excessive generated heat (thermal issues), excessive battery current, and excessive output power (very high TRP).

Accordingly, a need exists for optimizing the RX mode OTA performance of a wireless terminal. A further need exists for simultaneously optimizing the TX mode OTA performance and the RX mode OTA performance of a wireless terminal. An additional need exists for controlling the maximum radiated power (TRP), the maximum phone temperature, and the maximum phone battery current (Ibatt).

DISCLOSURE

The above described needs are fulfilled, at least in part, by receiving at a wireless terminal a remote signal and adjusting a tuner of the wireless terminal in accordance with the received signal to optimize OTA performance of the wireless terminal. As further remote signals are received by the wireless terminal, the tuner is readjusted.

Concurrently with the tuner being adjusted in accordance with the received signals, as a user inputs information to be transmitted, the tuner is also readjusted in accordance with the transmission signals to optimize OTA performance of the wireless terminal. A best compromise between the TX OTA performance and the RX OTA performance is calculated. Battery current and phone temperature information may also be obtained for readjusting the tuner.

The RX OTA performance can be optimized by measuring the TX frequency band antenna impedance, deriving the RX band antenna impedance from the measured TX frequency band antenna impedance using a look-up table, and calculating from the derived value the ideal RX mode auto tuner matching core set-up. Alternatively, the RX OTA performance can be optimized by obtaining received signal strength information, bit error rate information, block error rate information, or frame erasure rate information from a baseband demodulation section of the wireless terminal. The tuner is adjusted in response to the transmission signals by determining the optimum delivered transmission power to and from the antenna.

The wireless terminal includes an RF transceiver, an auto tuner, and an antenna. The auto tuner is adjusted in response to the received signal to optimize OTA performance. The auto tuner is also adjusted in response to the transmitted signal to optimize OTA performance. The auto tuner is configured to calculate the best compromise between the TX OTA performance and the RX OTA performance. Auto tuner control information related to the phone battery current and phone temperature passes between the RF transceiver and the auto tuner. The auto tuner includes at least a tuner core, an antenna impedance measurement unit, and a controller. A look-up table can be accessed to relate TX impedance with RX impedance of the antenna. A baseband demodulation section is coupled to the RF transceiver.

When a call is received by the wireless terminal, the Antenna Reflection Coefficient, TX performance, and RX performance are measured to determine the initial Antenna environment. The results are stored. A search is performed for prior performance environment data. If no such data is found, OTA data is measured for each of a set of pre-determined core set-ups. If an optimum OTA level is achieved, the data is stored and the wireless terminal awaits another call. Otherwise, the process returns to measuring the antenna environment. When historical performance environment data is found, a determination is made as to whether prior optimization has occurred. If no prior optimization is found, a pre-programmed Reflection Coefficient search algorithm is used to evaluate OTA data as a function of the Tuner-Core setup. If an optimum OTA level is achieved, the data is stored and the wireless terminal awaits another call. Otherwise, the process returns to measuring the antenna environment. When prior optimization data is located, the Antenna Reflection Coefficient from the prior optimized calls is compared to the current Antenna Reflection Coefficient. If the comparisons produce an acceptable OTA performance level, the data is stored, and the wireless terminal awaits another call. Otherwise, preprogrammed Reflection Coefficient data again is used to measure OTA data.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

Figure 1:
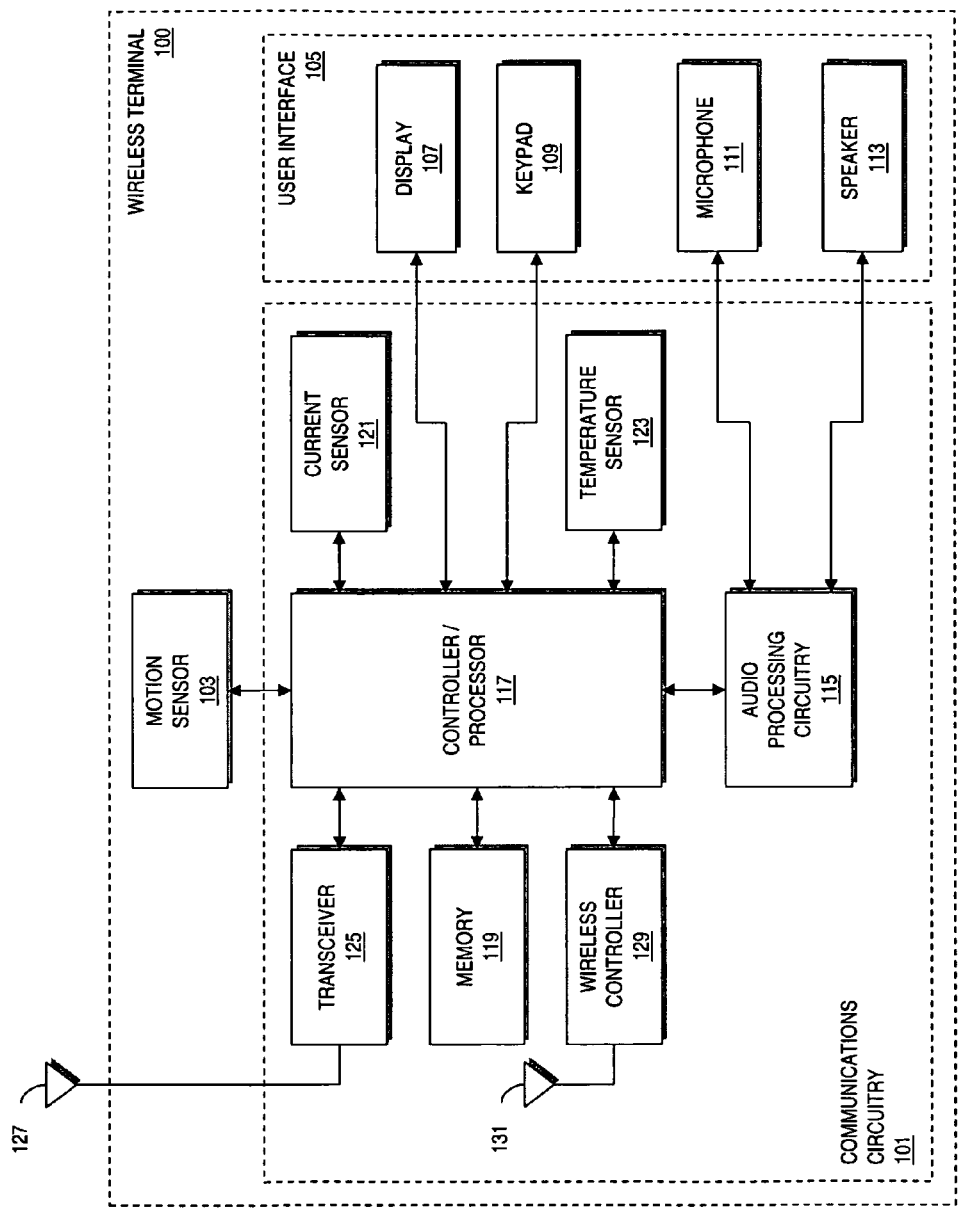
FIG. 1 is a block diagram of a wireless terminal, according to an exemplary embodiment.

FIG. 1 is a block diagram of a wireless terminal 100, according to an exemplary embodiment. Wireless terminal 100 includes communications circuitry 101, motion sensor 103, and user interface 105. User interface 105 includes display 107, keypad 109, microphone 111, and speaker 113. Display 107 provides a graphical interface that permits a user of wireless terminal 100 to view dialed digits, call status, menu options, and other service information. The graphical interface may include icons and menus, as well as other text and symbols. Keypad 109 includes an alphanumeric keypad and may represent other input controls, such as a joystick, button controls, touch panel, dials, etc. The user thus can construct user profiles, enter commands, initialize applications, input remote addresses, and select options from menu systems. Microphone 111 converts spoken utterances of a user into electronic audio signals, while speaker 113 converts audio signals into audible sounds.

Communications circuitry 101 includes audio processing circuitry 115, controller (or processor) 117, memory 119, current sensor 121, temperature sensor 123, transceiver 125 coupled to antenna 127, and wireless controller 129 coupled to antenna 131. Memory 119 may represent a hierarchy of memory, which may include both random access memory (RAM) and read-only memory (ROM). Computer program instructions, such as antenna tuning instructions, and corresponding data for operation can be stored in non-volatile memory, such as erasable programmable read-only memory (EPROM), electrically erasable programmable read-only memory (EEPROM), and/or flash memory. Memory 119 may be implemented as one or more discrete devices, stacked devices, or integrated with controller 117. Memory 119 may store information, such as one or more user profiles, one or more user defined policies, one or more contact lists, etc. Memory 119 may include a database with a look-up table.

Controller 117 controls the operation of wireless terminal 100 according to programs and/or data stored to memory 119. Control functions may be implemented in a single controller or via multiple controllers. Suitable controllers may include, for example, both general purpose and special purpose controllers and digital signal processors. Controller 117 may interface with audio processing circuitry 115, which provides basic analog output signals to speaker 113 and receives analog audio inputs from microphone 111. Current sensor 121 senses current drawn from a battery (not illustrated). Temperature sensor 123 senses the temperature of transceiver 125.

Figure 2:
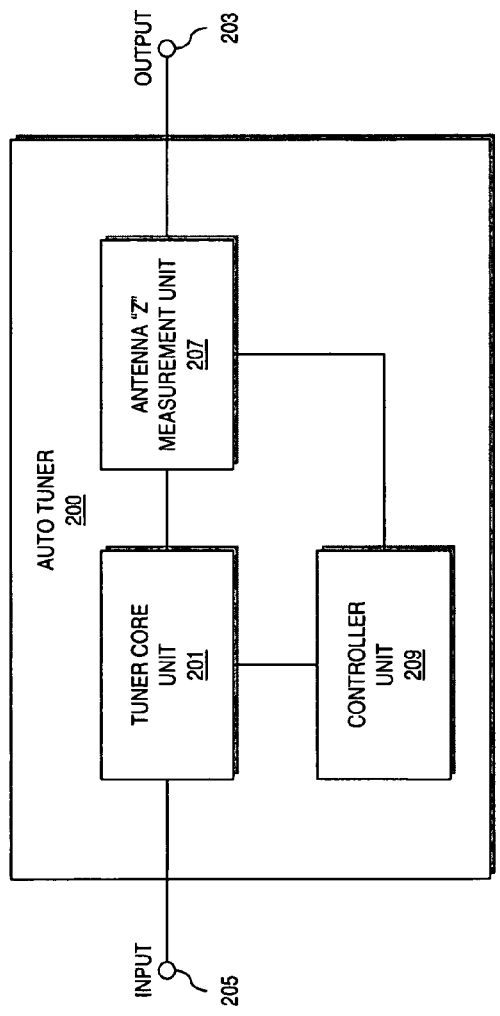
FIG. 2 is a block diagram of an auto tuner.

FIG. 2 is a block diagram of a conventional auto tuner 200. Tuner core unit 201 is a digitally controlled matching network. Unit 201 transforms the antenna impedance to another value at input port 205. Antenna "Z" measurement unit 207 measures performance parameters that facilitate deriving the antenna impedance that may be determined in real-time. Controller unit 209 provides necessary housekeeping functionality, such as providing microprocessor, memory, and data measurement ADC (analog to digital) functionality. One purpose of auto tuner 200 of FIG. 2 is to optimize power transmission between a radio coupled to input port 205 and an antenna coupled to output port 203. However, prior art auto tuning solutions optimize only TX mode derived data. Thus, it is apparent that improvements are needed.

Figure 3:
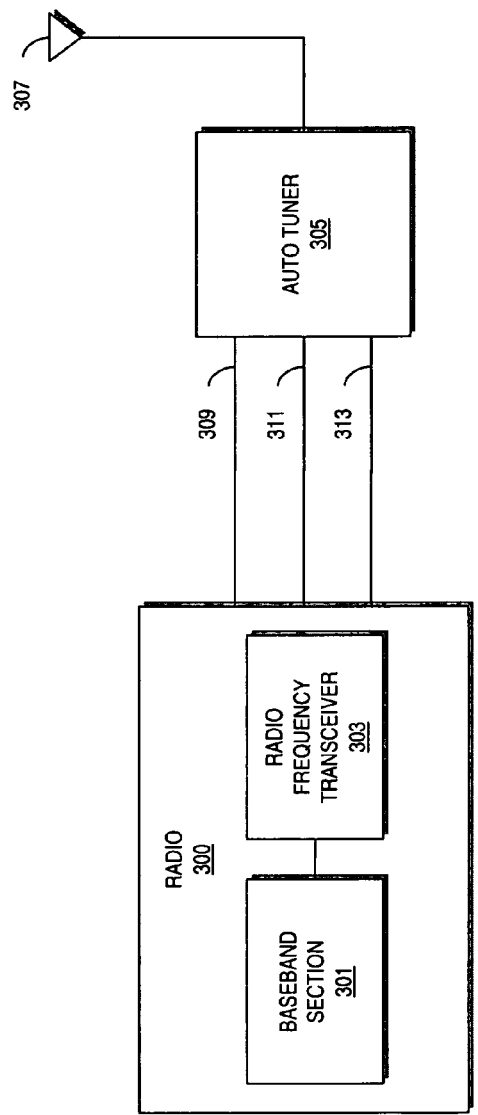
FIG. 3 is a block diagram of a portion of a wireless terminal, according to an exemplary embodiment.

FIG. 3 is a block diagram of a portion of a wireless terminal, such as wireless terminal 100, according to an exemplary embodiment. Baseband section 301 of radio 300 receives data from a base station (not shown) and provides general control of radio data. Radio frequency (RF) transceiver 303 of radio 300 generates modulated transmission signal(s) in TX mode and demodulates RF energy in RX mode. Auto tuner 305 performs impedance matching between transceiver 303 and antenna 307. Auto Tuner 305 utilizes RX performance feedback information 309 and current and/or temperature feedback information 311 in addition to standard TX performance feedback information 313 (between antenna 307 and auto tuner 305) to control tuner core unit 201 of FIG. 2. The RX feedback information 309, current/temperature feedback information 311, and general control/messaging information 313 represent information passing between transceiver 303 and auto tuner 305. A general control/messaging port (not illustrated) is utilized as a primary communication interface to the wireless terminal, e.g., wireless terminal 100. In exemplary embodiments, this port can be bi-directional. Data regarding control commands (to auto tuner 305), OTA performance feedback (to auto tuner 305), and auto tuner feedback (to the wireless terminal) may be exchanged via the bi-directional port.

Figure 4:
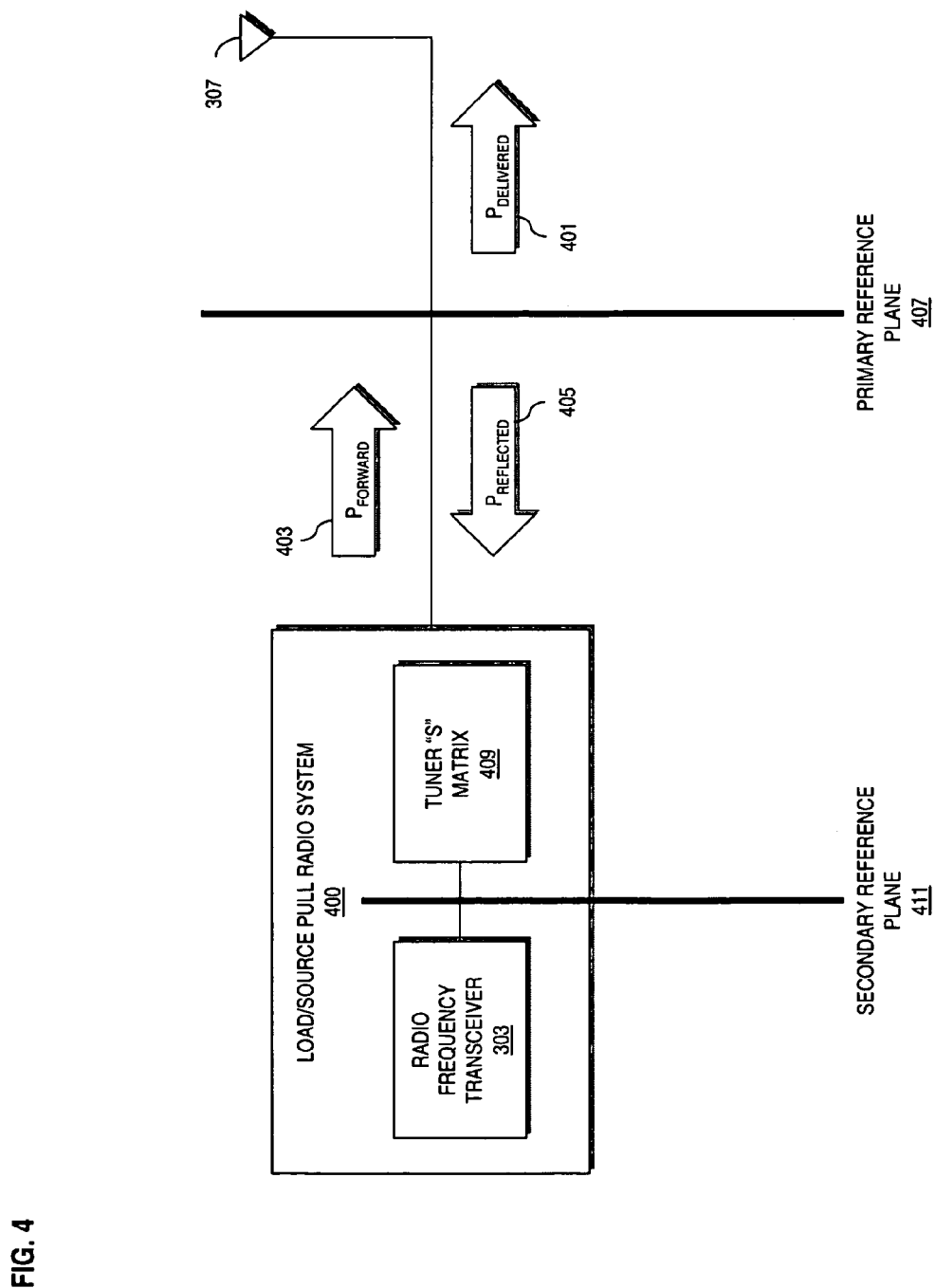
FIG. 4 is a diagram of an overall transmission mode power definition, according to an exemplary embodiment.

TX performance feedback information is, in exemplary embodiments, based on, at least, the actual RF power delivered to antenna 307. Delivered power is defined in terms of both forward power and reflected. This approach allows high power conditions to be detected, as well as enables the TRP to be optimized during a communication session, such as a voice call. FIG. 4 is a diagram of an overall TX mode power definition, according to an exemplary embodiment. In this example, power delivered ($P_{delivered}$) 401 equals forward power ($P_{forward}$) 403 minus reflected power ($P_{reflected}$) 405, relative to primary reference plane 407. Forward power 403 is a function of one or more TX load pull contours (described in more detail in association with FIG. 5), the tuner terminated two port "S" matrix 409 (i.e., a scattering matrix which defines performance of tuner core unit 201 under matching conditions), and an impedance of antenna 307. Reflected power 405 is a function of an impedance of radio driving source 400 and an impedance of antenna 307. Prior art auto tuners measure only forward power 403 or reflected power 405. However, accounting for both measurements more properly assesses delivered power 401 to antenna 307 and, thus, achieves a more optimal TRP performance in a given time.

Optimum TX system OTA performance is indicated by the desired TRP, low Ibatt, and low operating phone temperature. TRP is a function of the TX system load, the TX system load-pull contours, and the auto tuner performance under both the load-pull and the source-pull conditions. Conventionally, TRP is characterized by Equation 1:

$$TRP = 50 \text{ Ohm Output Power} + \text{Load-Pull Contour Offset} + \text{Tuner Perf} + C \qquad \text{Eq. 1}$$

where

50 Ohm Output Power=A conducted amount of output power assuming a 50 Ohm load

Load-Pull Contour Offset=A change in the amount of conducted output power with a load Tuner Perf=An effective tuner insertion loss under antenna matching conditions C=A predetermined constant By changing the auto tuner servo goal away from 50 Ohms, wireless terminal 100 can take advantage of both a load-pull contour offset parameter and a tuner performance parameter, which enables wireless terminal 100 to achieve better OTA performance than the conventional 50 Ohm matching technique. It is noted that an optimum compromise between these two parameters can often be necessary.

Figure 5:
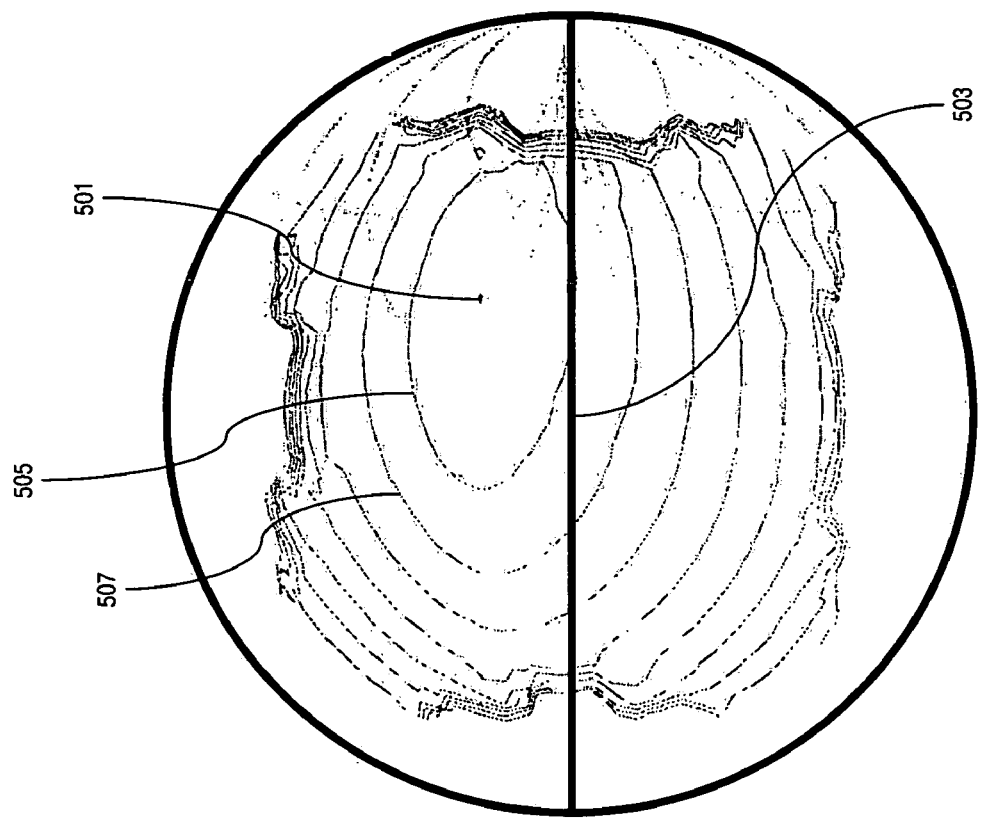
FIG. 5 is a transmission system load-pull contour plot, according to an exemplary embodiment.

FIG. 5 is a TX system load-pull contour plot, according to an exemplary embodiment. Each contour (e.g., contour 501) represents a constant delivered amount of power into a specific load impedance. The center 503 corresponds to 50 Ohms. In this manner, the smaller contours represent higher delivered power levels, with an optimum delivered power being indicated by contour 501. The contours are shown at intervals of 1 dB for a delivered power amount. Thus, contours 505 and 507 represent 1 and 2 dB, respectively, lower amounts than the optimum delivered power amount. As indicated in FIG. 5, the optimum delivered power (i.e., counter 501) does not occur at 50 Ohms, i.e., it does not occur at center 501.

To determine the optimum load impedance for the TX system, the power added efficiency (PAE) contours must also be considered. The ratio of delivered power over PAE can be important to TRP optimization. PAE % is defined in Equation 2 as follows:

$$PAE\% = [\text{Delivered RF Output Power}]/[\text{DC Input Power} + \text{RF Input Power}]*100 \qquad \text{Eq. 2}$$

where
Delivered RF Output Power=An amount of radio frequency power delivered to, for example, antenna 307
DC Input Power=An amount of direct current power input to, for example, input 205
RF Input Power=An amount of radio frequency power input to, for example, input 205

Figure 6:
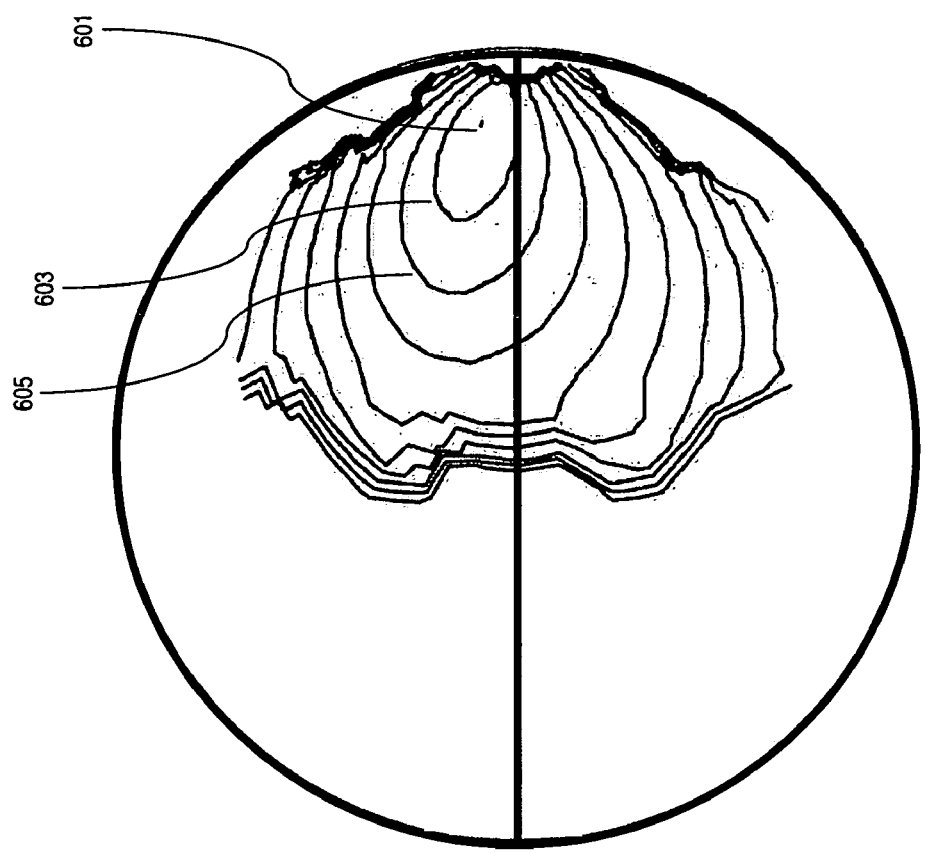
FIG. 6 is a transmission system power added efficiency contour plot, according to an exemplary embodiment.

FIG. 6 is a TX system PAE contour plot, according to an exemplary embodiment. The optimum PAE is indicated at contour 601, with contours 603 and 605 representing 5% and 10%, respectively, lower than optimum PAE levels.

TRP optimization also takes into account the tuner-core RF performance, which is predominantly characterized by an insertion loss. Insertion loss is a parameter characterizing performance of a two port network that can be defined by a transducer gain equation shown below in Equation 3:

$$Gt=[(|S_{21}|^2)*(1-|T_s|^2)*(1-|T_l|^2)]/[|(1-S_{11}*T_s)*(1-S_{22}*T_l)-(S_{21}*S_{12}*T_s*T_l)|^2] \qquad \text{Eq. 3}$$

where
Gt=a power gain of a transducer (db)
$S_{xy}$=50 Ohm normalized to the two port "S" matrix elements ($S_{11}$, $S_{12}$, $S_{21}$, $S_{22}$)
$T_s$=a source (i.e., input port) reflection coefficient
$T_l$=a load (i.e., output port) reflection coefficient.

Accordingly, the overall transducer power gain "Gt" can be considered a function of the source impedance, load impedance, and the device "S" matrix. However, given a load-pull power calculation, in which the power defined is the power delivered to a load, the transducer power gain must be normalized to account for input port mismatch loss. The normalized power gain, or operating power gain, is a special case of the transducer power gain. The operating power gain is defined in Equation 4 as follows:

$$G_{OP}=[1/(1-|T_{in}|^2)]*|S_{21}|^2*[(1-|T_l|^2)/(|1-S_{22}*T_l|^2)] \qquad \text{Eq. 4}$$

where
$G_{OP}$=power delivered to the load divided by power into the network input port
$T_{in}=S_{11}+(S_{12}*S_{21}*T_l)/(1-S_{22}*T_l)$
where
$T_{in}$=the device input impedance with a generic load termination impedance $S_{xy}$=50 Ohm normalized to the two port "S" matrix elements ($S_{11}$, $S_{12}$, $S_{21}$, $S_{22}$).

By measuring the actual "power delivered," the control system does not have to account for the tuner-core loss as a function of the antenna load impedance.

RX system OTA performance is defined as total isotropic sensitivity (TIS). TIS performance is a function of the conducted sensitivity, RX input port impedance, the RX driving source impedance, and the auto tuner performance. TIS is characterized by Equation 5:

$$TIS=50\text{ Ohm Sens}+\text{Source-Pull Contour Offset}+\text{CPMML}+\text{Tuner Perf}+C1 \qquad \text{Eq. 5}$$

where
50 Ohm Sens=a conducted sensitivity with a 50 Ohm driving source impedance
Source-Pull Contour Offset=a change in conducted sensitivity versus the driving source impedance
CPMML=a complex port mismatch loss (or a loss associated with non-optimum impedance matching)
Tuner Perf=an effective tuner insertion loss under antenna matching conditions
C1=a predetermined constant.

In Equation 5, the complex port mismatch loss, i.e., CPMML, is dominant. Thus, even though secondary source-pull contour offset effects may be present, TIS optimization can usually be simplified to minimizing CPMML. CPMML is defined in Equation 6 as follows:

$$\text{CPMML db}=-10*\text{Log}[[(1-\text{mag}(T_{ant})^2)*(1-\text{mag}(T_{rx})^2)]/[\text{mag}(1-T_{rx}*T_{ant})^2]] \qquad \text{Eq. 6}$$

where
Tant=an antenna reflection coefficient
Trx=a receiver input reflection coefficient The antenna reflection coefficient may be measured by a directional coupler. If a directional coupler is used, however, the measurement must be normalized. Each reflection coefficient parameter can be defined in terms of a port impedance relative to a standard reference impedance, as shown in Equation 7 as follows:

$$Tx=[Z-Z0]/[Z+Z0] \qquad \text{Eq. 7}$$

where
Z=a port impedance of the device being tested
Z0=a reference impedance.

Thus, given a dominant CPMML term, optimum TIS is achieved when the matched antenna impedance is the conjugate of the Radio RX input impedance.

RX mode TIS optimization is challenging because without an extra RX frequency band RF measurement source (which is expensive), it is not currently possible to directly measure the substantially real-time RX mode antenna impedance. According to certain exemplary embodiments, there are two new unique methods to deal with this problem. In a first method, the RX mode auto tuner matching core set-up is calculated based on the measured TX frequency band antenna impedance. A second method is based on direct feedback from the wireless terminal baseband section 307.

The first method begins by measuring directly the TX frequency band antenna impedance. Next, the RX band antenna impedance is derived via a look-up table. Given the RX system input impedance and source-pull contours, the auto tuner micro-controller calculates the ideal RX mode auto tuner matching core set-up. Then, the auto tuner micro-controller calculates the best compromise matching core set-up between the TX and RX modes. As such, no feedback requirements from the baseband section 307 are required.

The second method utilizes existing baseband demodulation parameters such as input signal strength, demodulation quality, etc. Such parameters provide a way to assess the performance changes associated with substantially real-time impedance matching. Any parameter that is useful to assessing the radio demodulation performance may be utilized for the RX feedback function upon which this optimization method is based. The RX feedback may include information about the RSSI (received signal strength), BER (Bit Error Rate), BLER (Block Error Rate), or FER (frame erasure rate). This information is sent to the auto tuner from the wireless terminal baseband section 307. The auto tuner then utilizes the demodulation feedback to find the best compromise between the RX mode optimum performance tuner core setup and the TX mode optimum performance tuner core setup.

Returning to FIG. 3, the current/temperature feedback information 311 serves as a safety function during OTA optimization. The current feedback enables monitoring of the overall current drawn from a battery of the wireless terminal, such as wireless terminal 100. The temperature feedback enables monitoring of the RF transceiver temperature. Either source of feedback information, or a combination thereof, can be utilized to govern the auto tuner impedance matching network set-up. Auto tuner impedance matching set-ups that require excessive battery current and/or excessive RF transceiver temperatures are mapped (stored) as poor options and are not utilized during active OTA performance optimization. This information may be sent to the auto tuner via dedicated input ports or a common digital control port.

The software algorithms are defined by four operational modes:

Mode 1—Initial Start, Present Environment Evaluation, Select Appropriate Opt Mode;
Mode 2—Search for a solution with zero historical performance environment data;
Mode 3—Search for a solution with pre-programmed Antenna Impedance data; and
Mode 4—Search for a solution with prior optimization data.

Mode 2 is the slowest. This mode is very useful for allowing a phone to "auto" OTA optimize. During the wireless terminal R&D phase, the phone can auto learn the OTA optimization parameters that eventually may be loaded into the production software. Mode 3 is the medium speed approach. A default antenna impedance table is utilized to characterize the present antenna impedance situation and the proceed to an OTA optimization. Mode 4 is the fast approach. Successful optimization data from past trials is utilized to characterize the present antenna impedance situation and then proceed to an OTA optimization.

Figure 7:
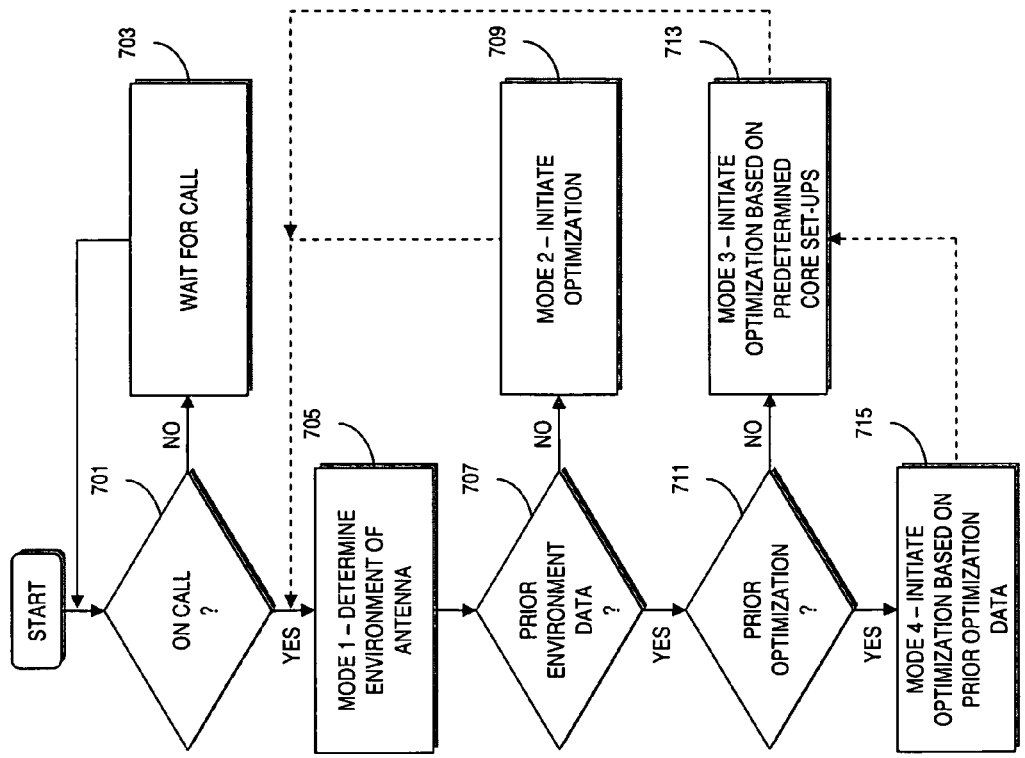
FIG. 7 is a flowchart of a process for implementing the auto tuner functionality, according to an exemplary embodiment.
Figure 8:
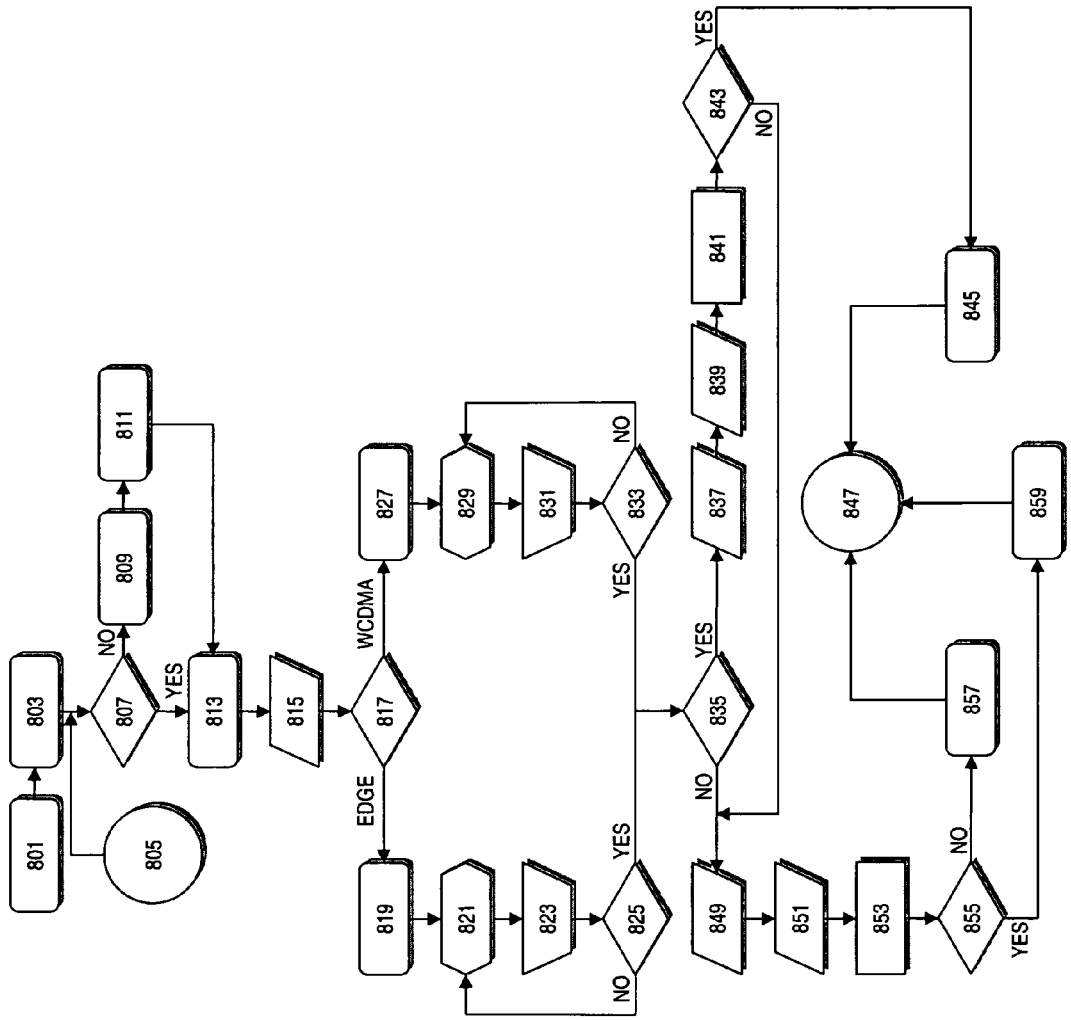
FIGS. 8-11 are flowcharts of a process for implementing the auto tuner functionality, according to an exemplary embodiment.

FIG. 7 is a flowchart of a process for implementing the auto tuner functionality, according to an exemplary embodiment. The process begins with operational Mode 1. At step 701, auto tuner 305 determines whether wireless terminal 100 is engaged in a communication session (or call mode), e.g., voice call, data transfer, etc. If no communication session is active, auto tuner 305 waits for communication session engagement, per step 703. Once wireless terminal 100 engages in a communication session, auto tuner 305 determines an environment of antenna 307 at, for instance, the beginning of the communication session (step 705). That is, the antenna reflection coefficient, TX performance, and RX performance are measured, and the results are stored to, for example, memory 119. Based on this preliminary evaluation of the environment, auto tuner 305 proceeds to select an appropriate optimization mode.

At step 707, auto tuner 305 checks, for example, memory 119 for previously stored antenna environment data. If no historical performance environment data is found, then auto tuner 305 proceeds to step 709 and implements a slowest speed search algorithm (Mode 2) to measure OTA. Namely, the tuner is cycled through a set of pre-determined core set-ups, and the OTA data is measured. More specifically, a general search pattern is used to locate regions of potential OTA optimization, and then a gradient search is used to fine tune the potential optimization regions. Once the tuner has found an acceptable OTA performance level, the auto tuner core is set, and the data is stored. If no acceptable OTA performance level is obtained, then the algorithm returns to step 705.

If pre-programmed antenna environment data is found at step 707, auto tuner 305 determines, at step 711, if prior optimization has occurred, i.e., if prior optimization data is stored to, for instance, memory 119. If no prior optimization data is found, then auto tuner 305 begins optimization (Mode 3), in step 713. Optimization is performed similarly to step 709; however, optimization utilizes the pre-programmed antenna reflection coefficient data, which translates into a faster optimization process than in step 709. Again, if no acceptable OTA performance level is obtained, then the algorithm returns to step 705.

If prior optimization data is found at step 711, auto tuner 305 begins optimization (Mode 4) based on past trials, per step 715. Since previous data is available to auto tuner 305, step 715 optimization is the fastest of the optimization modes of auto tuner 305. Successful optimization data from past trials is utilized to characterize the present antenna impedance situation. In other words, the desired tuner core setup is selected by comparing the present antenna reflection coefficient to the antenna reflection coefficients from previous communication sessions. If step 715 optimization does not find a solution, then step 709 optimization is utilized instead. Using the process of FIG. 7, wireless terminal 100 can "learn" the characteristics of a user, and the resultant OTA optimization cycles will be faster.

FIGS. 8 through 11 are flowcharts showing in more detail the process of FIG. 7. More specifically, FIGS. 8 through 11 represent operational Modes 1 through 4, respectively, of auto tuner 305. Auto tuner 305 begins Mode 1, present environment evaluation, at step 801. Initially, auto tuner 305 is not actively tuning, so an idle flag is set at step 803. If at any time during the process any of Modes 2 through 4 determines that wireless terminal 100 is not engaged in a communication session (or call mode), e.g., voice call, data transfer, etc., auto tuner 305 returns at step 805 to Mode 1. At step 807, auto tuner 305 determines whether or not wireless terminal 100 is engaged in a communication session. If no communication session is active, auto tuner 305 sets an idle flag at step 809 and waits for communication session engagement, per step 811. Once wireless terminal engages is in a call mode, auto tuner 305, at step 813, places the set-up in a "thru" mode, and a flag is set indicating that auto tuner 305 is actively tuning and in Mode 1. At step 815, auto tuner 305 obtains band, channel, frequency, and wireless terminal mode information.

At step 817, auto tuner 305 determines which protocol is being used by wireless terminal 100, wideband code division multiple access (WCDMA) or enhanced data rates for GSM evolution (EDGE). If wireless terminal 100 is in an EDGE mode, a burst limit is set at step 819. The burst limit is the maximum number of bursts permitted when sampling the present "thru" condition. Auto tuner 305 proceeds to step 821 and measures TX and RX performance and the antenna reflection coefficient. The measured data is stored in a "thru" matrix, for example in memory 119 (step 823). At step 825, auto tuner 305 determines whether the burst limit has been exceeded. If not, auto tuner returns to step 821 and again measures TX and RX performance and the antenna reflection coefficient.

If at step 817, auto tuner determines that wireless terminal 100 is in a WCDMA mode, then a time limit is set at step 827. The time limit is the maximum elapsed time permitted when sampling the present "thru" condition. Auto tuner 305 proceeds to step 829 and measures TX and RX performance and the antenna reflection coefficient. The measured data is stored in a "thru" matrix, for example in memory 119 (step 831). At step 833, auto tuner 305 determines whether the time limit has been exceeded. If not, auto tuner returns to step 829 and again measures TX and RX performance and the antenna reflection coefficient.

If the burst limit at step 825 or the time limit at step 833 has been exceeded, auto tuner 305 proceeds to step 835 to determine if prior optimization has occurred. If auto tuner 305 discovers prior optimization has occurred, the past call "thru" matrix and the present call "thru" matrix" are obtained at steps 837 and 839, respectively. An antenna reflection coefficient analysis hysteresis is loaded at step 841, and auto tuner 305 checks for an antenna reflection coefficient correlation (step 843). If a correlation is obtained, the auto tuner sets a Mode 4 flag (step 845), indicating that the auto tuner is active and in a fast speed optimization mode and proceeds to Mode 4 at step 847.

If, at step 835, no prior optimization is discovered, auto tuner 305 proceeds to step 849 and retrieves antenna data from a default antenna reflection coefficient matrix. This matrix stores typical antenna reflection coefficient values under multiple antenna environment conditions. Auto tuner 305 also recalls the present call "thru" matrix from memory at step 851. An antenna reflection coefficient analysis hysteresis is loaded at step 853, and auto tuner 305 checks for an antenna reflection coefficient correlation (step 855). If no correlation is obtained, auto tuner 305 sets a Mode 2 flag (step 857), indicating that the auto tuner is active and in a slow speed optimization mode, and proceeds to Mode 2 at step 847. If, on the other hand, there is an antenna reflection coefficient correlation between the past and present data, then auto tuner 305 sets a Mode 3 flag (step 859), indicating that the auto tuner is active and in a medium speed optimization mode, and proceeds to Mode 3 at step 847.

Figure 9:
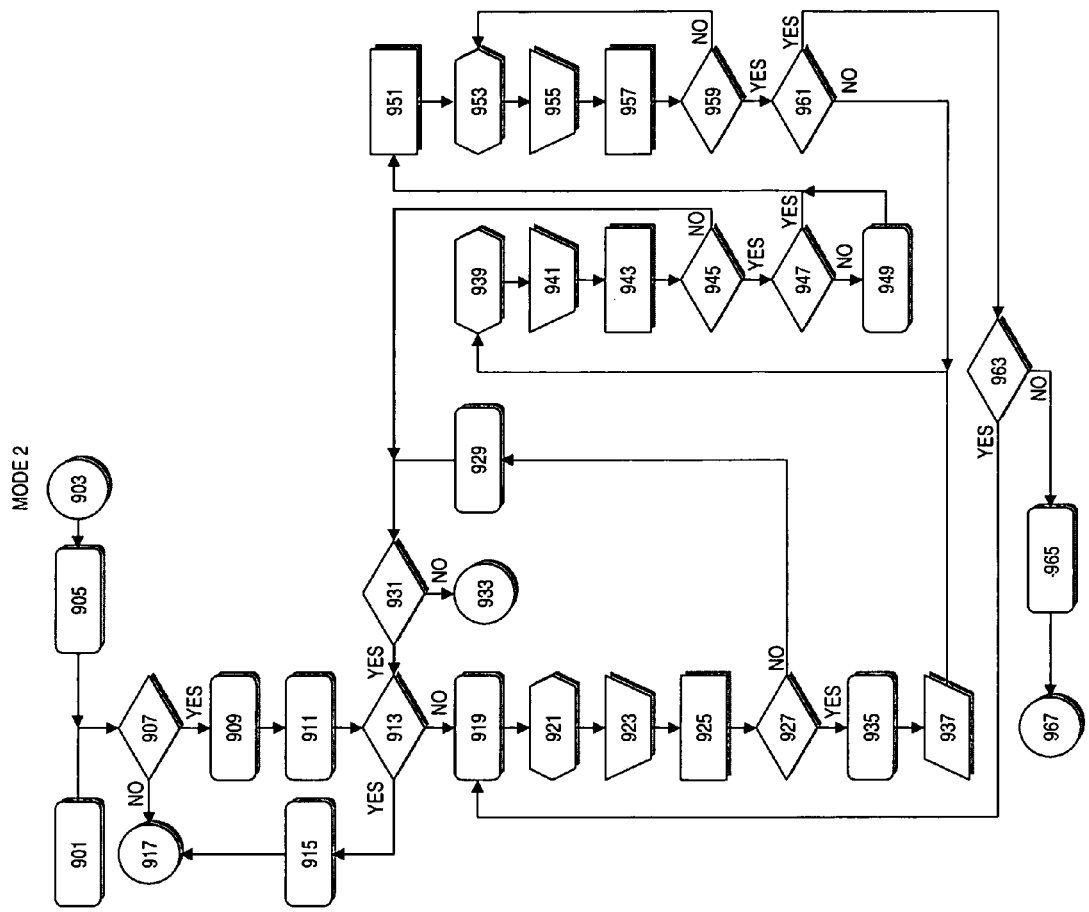

FIG. 9 is a flowchart of a process for implementing the auto tuner functionality in Mode 2, according to an exemplary embodiment. Auto tuner 305 begins Mode 2 at step 901. If the auto tuner returns to Mode 2 from Mode 3, for example at step 903, a Mode 2 flag is set at step 905, and auto tuner 305 proceeds as if from step 901. Auto tuner 305 determines if wireless terminal 100 is in a communication session, at step 907. If the wireless terminal is on call, then auto tuner 305 finds the most probable "thru" performance data point and establishes the "thru" antenna reflection coefficient starting point at step 909. At step 911, auto tuner 305 initializes a course search matrix (CSM) search criteria. This matrix stores the data used to set up the tuner core for either a "pattern" based OTA performance search or a "gradient" based OTA performance search. The data stored in this matrix is intended to command the tuner core for a somewhat rough search resolution. If the CSM search criteria is exceeded (step 913), then a Mode 2 error flag is set at step 915 indicating that the auto tuner was unable to find an OTA solution within Mode 2. In that case, the auto tuner then returns to Mode 1 at step 917 to begin the entire process again.

If the CSM search criteria is not exceeded in step 913, auto tuner 305 calculates a CSM measurement tuner control matrix at step 919 and measures TX and RX performance at each CSM point at step 921. The measured data is stored, for example in memory 119, at step 923. The CSM search analysis hysteresis is loaded at step 925, and a determination is made at step 927 as to whether OTA performance has improved. If no improvement has occurred, then the CSM measurement tuner control matrix is updated at step 929, and the auto tuner again checks at 931 whether the wireless terminal 100 is in a communication. If wireless terminal 100 is no longer in a call mode, then the auto tuner returns to Mode 1 in step 933. If the wireless terminal is still in a call mode, auto tuner 305 returns to step 913 to determine if CSM search criteria has been exceeded.

If improvement has occurred at step 927, then auto tuner 305 calculates the fine search matrix (FSM) measurement tuner control matrix at step 935. This matrix, like the CSM stores the data used to set up the tuner core for either a "pattern" based OTA performance search or a "gradient" based OTA performance search. However, the data stored in this matrix is intended to command the tuner core for a fine search resolution. The input data is obtained from the CSM and refined into an intelligent search method. This matrix is utilized to help the tuner learn the fine tuner core setup options. At step 937 auto tuner 305 obtains maximum battery current and partial discharge limits (safety and heat limits).

Auto tuner 305 measures TX and RX performance at each FSM point at step 939. The measured data is stored, for example in memory 119, at step 941. The FSM search analysis hysteresis is loaded at step 943, and the best performance FSM is compared to the best performance CSM at step 945. If the FSM performance is not better than the CSM performance, then auto tuner 305 returns to step 931 to determine if wireless terminal 100 is still in a call mode. If the FSM performance is better than the CSM performance, then auto tuner 305 proceeds to step 947 to determine if the solution has the best acceptable maximum battery current and phone temperature. If not, auto tuner 305 selects FSM option that meets safety requirements (949).

Once safety requirements are met, auto tuner 305 loads the best tuning option at step 951 and monitors RF performance at 953. The monitored data is stored in a long term matrix (LTM) at step 955. This matrix is used to store the tuner core configurations that have been proven to improve overall OTA performance. Both matched and "thru" data is stored in the LTM. This enables the control system to easily correlate an antenna reflection coefficient to a tuner core configuration that will improve OTA performance. A monitor analysis hysteresis is loaded at step 957, and a determination is made at step 961 as to whether a performance degradation threshold has been reached. If the threshold has not been reached, then auto tuner 305 returns to step 953 and monitors RF performance again. If the threshold has been reached, then a determination is made at step 961 as to whether an extreme degradation threshold has been reached. If the threshold has not been reached, then auto tuner 305 returns to step 939 and remeasures the TX and RX performance at each FSM point. If an extreme degradation threshold has been reached at step 961, then auto tuner 305 checks at step 963 whether the wireless terminal is still in call mode. If the wireless terminal is still in a call mode, auto tuner 305 returns to step 919 and recalculates the CSM measurement tuner control matrix. If the wireless terminal is no longer in a call mode at step 963, auto tuner 305 sets the "thru" tuner mode at 965 and returns to Mode 1 at 967.

Figure 10:
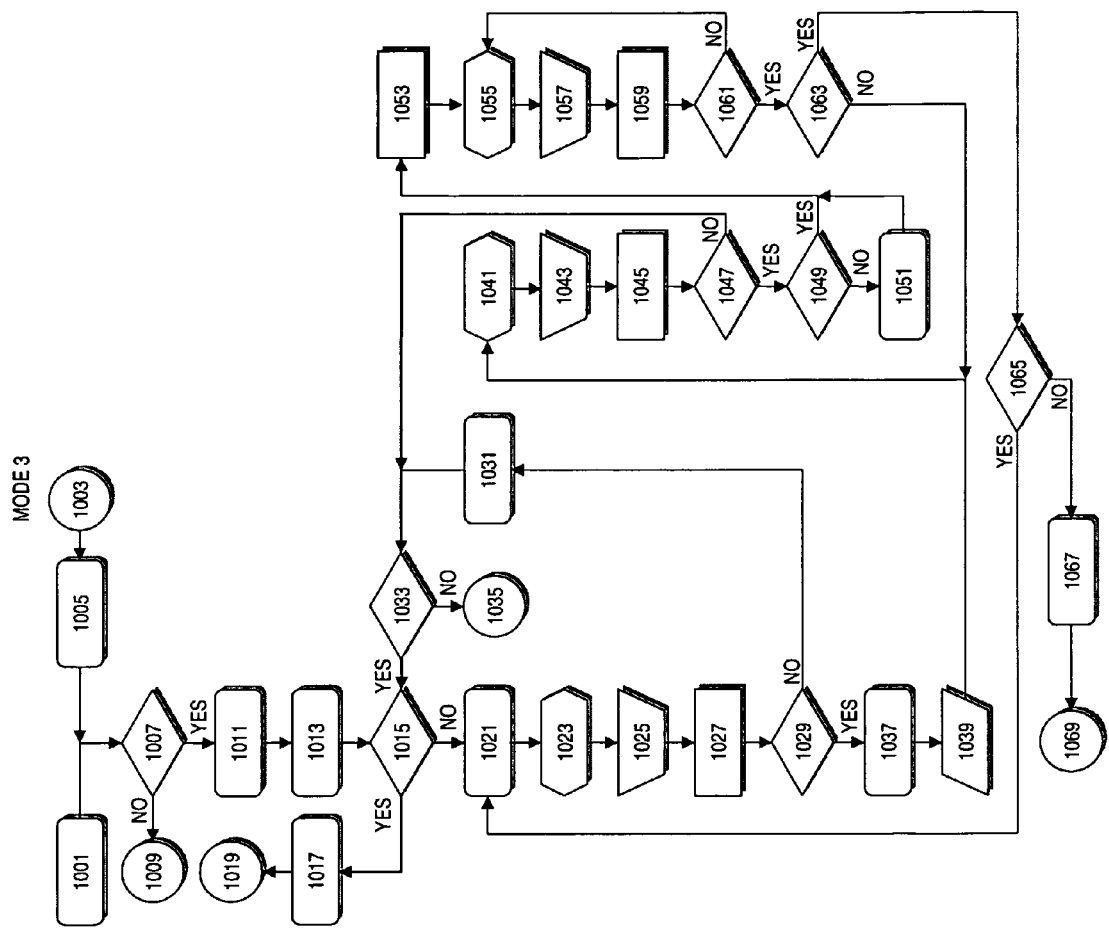

FIG. 10 is a flowchart of a process for implementing the auto tuner functionality in Mode 3, according to an exemplary embodiment. Auto tuner 305 begins Mode 3 at step 1001. If the auto tuner returns to Mode 3 from Mode 4, for example at step 1003, a Mode 3 flag is set at 1005, and auto tuner 305 proceeds as if from step 1001. Auto tuner 305 determines if wireless terminal 100 is in a communication session, at step 1007. If the wireless terminal is not on call, then auto tuner 305 returns to Mode 1 at step 1009. If the wireless terminal is on call at step 1007, then auto tuner 305 corrects the measured "thru" antenna reflection coefficient for impedance errors at step 1011. At step 1013, auto tuner 305 initializes a course search matrix (CSM) search criteria. This matrix stores the data used to set up the tuner core for either a "pattern" based OTA performance search or a "gradient" based OTA performance search. The data stored in this matrix is intended to command the tuner core for a somewhat rough search resolution. If the CSM search criteria is exceeded (step 1015), then a Mode 3 error flag is set at step 1017 indicating that the auto tuner was unable to find an OTA solution within Mode 3. In that case, the auto tuner then returns to Mode 2 at step 1019 to begin Mode 2 optimization.

If the CSM search criteria is not exceeded in step 1015, auto tuner 305 calculates a CSM measurement tuner control matrix at step 1021 and measures TX and RX performance at each CSM point at step 1023. The measured data is stored, for example in memory 119, at step 1025. The CSM search analysis hysteresis is loaded at 1027, and a determination is made at 1029 as to whether OTA performance has improved. If no improvement has occurred, then the CSM measurement tuner control matrix is updated at step 1031, and the auto tuner again checks at 1033 whether the wireless terminal 100 is in a communication. If wireless terminal 100 is no longer in a call mode, then the auto tuner returns to Mode 1 at step 1035. If the wireless terminal is still in a call mode, auto tuner 305 returns to step 1015 to determine if CSM search criteria has been exceeded.

If improvement has occurred at step 1029, then auto tuner 305 calculates the fine search matrix (FSM) measurement tuner control matrix at step 1037. This matrix, like the CSM stores the data used to set up the tuner core for either a "pattern" based OTA performance search or a "gradient" based OTA performance search. However, the data stored in this matrix is intended to command the tuner core for a fine search resolution. The input data is obtained from the CSM and refined into an intelligent search method. This matrix is utilized to help the tuner learn the fine tuner core setup options. At step 1039 auto tuner 305 obtains maximum battery current and partial discharge limits (safety and heat limits).

Auto tuner 305 measures TX and RX performance at each FSM point at step 1041. The measured data is stored, for example in memory 119, at step 1043. The FSM search analysis hysteresis is loaded at 1045, and the best performance FSM is compared to the best performance CSM at step 1047. If the FSM performance is not better than the CSM performance, then auto tuner 305 returns to step 1033 to determine if wireless terminal 100 is still in a call mode. If the FSM performance is better than the CSM performance, then auto tuner 305 proceeds to step 1049 to determine if the solution has the best acceptable maximum battery current and partial discharge. If not, auto tuner 305 selects FSM option that meets safety requirements (1051).

Once safety requirements are met, auto tuner 305 loads the best tuning option at step 1053 and monitors RF performance at 1055. The monitored data is stored in a long term matrix (LTM) at step 1057. This matrix is used to store the tuner core configurations that have been proven to improve overall OTA performance. Both matched and "thru" data is stored in the LTM. This enables the control system to easily correlate an antenna reflection coefficient to a tuner core configuration that will improve OTA performance. A monitor analysis hysteresis is loaded at step 1059, and a determination is made at step 1061 as to whether a performance degradation threshold has been reached. If the threshold has not been reached, then auto tuner 305 returns to step 1055 and monitors RF performance again. If the threshold has been reached, then a determination is made at step 1063 as to whether an extreme degradation threshold has been reached. If the threshold has not been reached, then auto tuner 305 returns to step 1041 and remeasures the TX and RX performance at each FSM point. If an extreme degradation threshold has been reached at step 1063, then auto tuner 305 checks at step 1065 whether the wireless terminal is still in call mode. If the wireless terminal is still in a call mode, auto tuner 305 returns to step 1021 and recalculates the CSM measurement tuner control matrix. If the wireless terminal is no longer in a call mode at step 1065, auto tuner 305 sets the "thru" tuner mode at 1067 and returns to Mode 1 at 1069.

Figure 11:
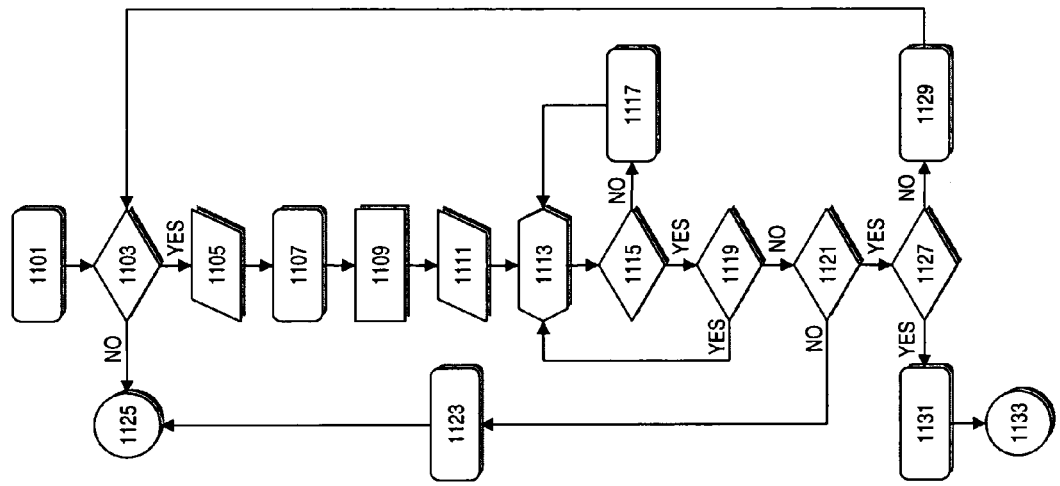

FIG. 11 is a flowchart of a process for implementing the auto tuner functionality in Mode 4, according to an exemplary embodiment. Auto tuner 305 begins Mode 3 at step 1101. Auto tuner 305 determines if wireless terminal 100 is in a communication session, at step 1103. If the wireless terminal is not on call, then auto tuner 305 returns to Mode 1 at step 1125. If the wireless terminal is on call at step 1103, then auto tuner 305 obtains data from the long term matrix (LTM) at 1105. Auto tuner 305 selects the highest probability tuner set up option at step 1107. A monitor analysis hysteresis is loaded at 1109. At step 1111, auto tuner 305 obtains maximum battery current and partial discharge limits (safety and heat limits).

At step 1113, auto tuner 305 measures TX and RX performance at selected LTM points. A determination is made at 1115 as to whether the maximum battery current and maximum phone temperature are acceptable. If not, auto tuner 305 selects a tuner set option with a lower maximum phone temperature and/or a lower maximum battery current at step 1117 and returns to step 1113 to remeasure TX and RX performance at selected LTM points. If the maximum battery current and maximum phone temperature are acceptable, then auto tuner 305 determines if the RF performance is similar to prior data (step 1119). If there is a similar performance, then auto tuner 305 returns to step 1113 to remeasure TX and RX performance at selected LTM points. If there is no similar performance, then auto tuner at 1121 checks whether wireless terminal 100 is still in a communication session. If not, the "thru" tuner mode is set at step 1123, and the auto tuner returns to Mode 1 at step 1125. If the wireless terminal is still in a call mode at step 1121, then auto tuner 305 determines whether all LTM options have been tried. If not, auto tuner 305 maps undesirable tuning options at step 1129 and returns to step 1103 to check whether the wireless terminal is on call. If all LTM options have been tried, a Mode 4 error flag is set at step 1131, and auto tuner returns to Mode 3 at step 1131.

In this disclosure there are shown and described only preferred embodiments and but a few examples of its versatility. It is to be understood that the disclosure is capable of use in various other combinations and environments and is capable of changes or modifications within the scope of the inventive concept as expressed herein.

What is claimed is:
1. A method of dynamically controlling wireless communication in accordance with a learning capability of an auto tuner of a wireless terminal comprising the steps of:
A) waiting for the wireless terminal to receive a call,
B) measuring a current antenna environment,

C) storing results of the measuring of the current antenna environment of step B, and D) checking for prior antenna environment data,
  1) if no prior antenna environment data is found, cycling the autotuner through a set of pre-determined core set-ups and measuring over-the-air (OTA) data to determine an OTA performance level,
    a) if an acceptable OTA performance level is obtained, setting a core of the autotuner, storing data associated with the OTA measurement and returning to step A,
    b) if no acceptable OTA performance level is obtained, returning to step B,
  2) if prior antenna environment data is found, determining if optimization data is found that is associated with prior optimization of the autotuner,
    a) if no prior optimization data is found, cycling the autotuner through the set of pre-determined core set-ups and utilizing prior Reflection Coefficient data to measure OTA data,
      i) if an acceptable OTA performance level is obtained, setting the core of the autotuner, storing data associated with the OTA measurement and returning to step A,
      ii) if no acceptable OTA performance level is obtained, returning to step B,
    b) if prior optimization data is found, selecting a core setup of the autotuner by comparing a present Antenna Reflection Coefficient to Antenna Reflection Coefficients from previous calls,
      i) if an acceptable OTA performance level is obtained, storing data associated with the OTA measurement and returning to step A, and
      ii) if no acceptable OTA performance level is obtained, returning to step D(2)(a).

2. The method of claim 1, wherein measuring the current antenna environment comprises measuring an Antenna Reflection Coefficient, transmit (TX) performance, and receive (RX) performance.

3. The method of claim 1, wherein the pre-determined core set-ups comprise pre-determined set-ups of an impedance matching network of the autotuner.

4. The method of claim 1, where setting the core of the autotuner comprises adjusting an impedance matching network of the autotuner to a setting that results in the acceptable OTA performance level.

5. A wireless terminal, comprising:
an antenna;
a transceiver; and
an auto tuner configured to:
  A—wait for reception of a call at the wireless terminal,
  B—measure a current antenna environment associated with the antenna,
  C—store results of the measuring of the current antenna environment,
  D—check for prior antenna environment data, and
    1—if no prior antenna environment data is found, cycle the autotuner through a set of pre-determined core set-ups and measure over-the-air (OTA) data to determine an OTA performance level,
      a—if an acceptable OTA performance level is obtained, set a core of the autotuner, store data associated with the OTA measurement and return to A,
      b—if no acceptable OTA performance level is obtained, return to B,
    2—if prior antenna environment data is found, determine if prior optimization data is found that is associated with prior optimization of the autotuner,
      a—if no prior optimization data is found, cycle the autotuner through the set of pre-determined core set-ups and utilize prior antenna Reflection Coefficient data to measure OTA data,
        i—if an acceptable OTA performance level is obtained, set the autotuner core, store data associated with the OTA measurement and return to A,
        ii—if no acceptable OTA performance level is obtained, return to B,
      b—if prior optimization data is found, select a core setup of the autotuner by comparing a present Antenna Reflection Coefficient to Antenna Reflection Coefficients from previous calls,
        i—if an acceptable OTA performance level is obtained, store data associated with OTA measurement and return to A, and
        ii—if no acceptable OTA performance level is obtained, return to D-2-a.

6. The wireless terminal of claim 5, wherein, when measuring the current antenna environment, the autotuner is configured to measure an Antenna Reflection Coefficient, transmit (TX) performance, and receive (RX) performance.

7. The wireless terminal of claim 5, wherein the pre-determined core set-ups comprise pre-determined set-ups of an impedance matching network of the autotuner.

8. The wireless terminal of claim 5, wherein, when setting the autotuner core, the autotuner is configured to adjust an impedance matching network of the autotuner to a setting that results in the acceptable OTA performance level.

* * * * *